United States Patent
Ewert (10) Patent No.: US 10,698,400 B2
(45) Date of Patent: Jun. 30, 2020

(54) METHOD FOR ACTIVATING A LOADING AND/OR UNLOADING EQUIPMENT OF A VEHICLE VIA A HOME AUTOMATION DEVICE AND METHOD FOR STEERING A VEHICLE TO A PREDETERMINED STOPPING AREA

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 15/775,954

(22) PCT Filed: Oct. 26, 2016

(86) PCT No.: PCT/EP2016/075770
§ 371 (c)(1),
(2) Date: May 14, 2018

(87) PCT Pub. No.: WO2017/097490
PCT Pub. Date: Jun. 15, 2017

(65) Prior Publication Data
US 2018/0373236 A1    Dec. 27, 2018

(30) Foreign Application Priority Data
Dec. 7, 2015 (DE) .......... 10 2015 224 468

(51) Int. Cl.
*G06Q 50/28* (2012.01)
*G05D 1/00* (2006.01)
(Continued)

(52) U.S. Cl.
CPC .......... *G05D 1/0011* (2013.01); *G01C 21/36* (2013.01); *G05D 1/0212* (2013.01); *G06F 21/35* (2013.01);
(Continued)

(58) Field of Classification Search
CPC ........ G08G 1/017; G08G 1/161; G06Q 10/08; G06Q 50/28; B60R 16/02; B60P 1/00; B60P 1/54
See application file for complete search history.

(56) References Cited

U.S. PATENT DOCUMENTS 8,135,507 B2 * 3/2012 Okabe .................... A61B 5/165
180/272
2010/0082569 A1 * 4/2010 Cresto .................. G06Q 10/087
707/705

(Continued)

OTHER PUBLICATIONS

International Search Report dated Feb. 13, 2017 of the corresponding International Application PCT/EP2016/075770 filed Oct. 26, 2016.

*Primary Examiner* — Tan Q Nguyen
(74) *Attorney, Agent, or Firm* — Norton Rose Fulbright US LLP; Gerard Messina (57) ABSTRACT

A method for activating loading and/or unloading equipment of an autonomous or semi-autonomous vehicle via a home automation device includes reading in a whereabouts signal representing a whereabouts of the vehicle in a predetermined stopping area via a communication interface to the vehicle, and subsequently, based on the whereabouts signal, providing an activation signal to the communication interface to activate the loading and/or unloading equipment to load and/or unload the vehicle in the stopping area.

21 Claims, 3 Drawing Sheets

(51) Int. Cl.
  *H04W 4/70* (2018.01)
  *G08G 1/017* (2006.01)
  *G06Q 10/08* (2012.01)
  *H04L 12/28* (2006.01)
  *G06F 21/35* (2013.01)
  *G06Q 50/30* (2012.01)
  *H04W 4/40* (2018.01)
  *G01C 21/36* (2006.01)
  *G05D 1/02* (2020.01)
  *G06K 7/10* (2006.01)
  *B60R 16/02* (2006.01)
  *G08G 1/16* (2006.01)

(52) U.S. Cl.
  CPC ..... *G06K 7/10297* (2013.01); *G06K 7/10366* (2013.01); *G06Q 10/08* (2013.01); *G06Q 10/083* (2013.01); *G06Q 50/30* (2013.01); *G08G 1/017* (2013.01); *H04L 12/2803* (2013.01); *H04W 4/40* (2018.02); *H04W 4/70* (2018.02); *G05D 2201/0213* (2013.01); *G06F 2221/2111* (2013.01); *G08G 1/163* (2013.01)

(56) References Cited

U.S. PATENT DOCUMENTS

| | | | |
|---|---|---|---|
| 2011/0022248 A1* | 1/2011 | McQuade | G06Q 10/06 701/2 |
| 2011/0137490 A1* | 6/2011 | Bosch | G08C 17/02 701/2 |
| 2014/0254896 A1* | 9/2014 | Zhou | B25J 9/0006 382/124 |
| 2014/0330456 A1 | 11/2014 | Lopez Morales et al. | |
| 2015/0006005 A1 | 1/2015 | Yu et al. | |
| 2015/0120094 A1 | 4/2015 | Kimchi et al. | |
| 2015/0148989 A1* | 5/2015 | Cooper | B60R 16/037 701/2 |
| 2015/0298654 A1* | 10/2015 | Joao | G01S 19/16 701/2 |
| 2016/0001720 A1* | 1/2016 | Vadgama | B60R 16/037 701/2 |
| 2016/0121479 A1* | 5/2016 | Lin | B25J 9/0003 700/264 |

* cited by examiner

METHOD FOR ACTIVATING A LOADING AND/OR UNLOADING EQUIPMENT OF A VEHICLE VIA A HOME AUTOMATION DEVICE AND METHOD FOR STEERING A VEHICLE TO A PREDETERMINED STOPPING AREA

CROSS-REFERENCE TO RELATED APPLICATIONS

The present application is the national stage of International Pat. App. No. PCT/EP2016/075770 filed Oct. 26, 2016, and claims priority under 35 U.S.C. § 119 to DE 10 2015 224 468.7, filed in the Federal Republic of Germany on Dec. 7, 2015, the content of each of which are incorporated herein by reference in their entireties.

BACKGROUND

Present vehicles can have communication interfaces for exchanging pieces of information and data with other vehicles or infrastructural components.

SUMMARY

Against this background, a method is presented by the approach presented here for activating a loading and/or unloading equipment of an autonomous or semi-autonomous vehicle via a home automation device, a method for controlling an autonomous or semi-autonomous vehicle to a predetermined stopping area to load and/or unload the vehicle, and furthermore devices which use these methods, and finally a corresponding computer program.

According to an example embodiment, a method for activating a loading and/or unloading equipment of an autonomous or semi-autonomous vehicle via a home automation device includes the steps of: reading in a whereabouts signal, which represents a whereabouts of the vehicle in a predetermined stopping area, via a communication interface to the vehicle; and providing an activation signal to the communication interface using the whereabouts signal to activate the loading and/or unloading equipment to load and/or unload the vehicle in the stopping area.

An autonomous or semi-autonomous vehicle can be understood as a vehicle which travels at least semi-autonomously, i.e., without assistance of a driver. The vehicle can be, for example, a passenger automobile or commercial vehicle, such as a postal, delivery, or refuse collection vehicle. A loading and/or unloading equipment can be understood as an equipment in the vehicle which can be designed to load a cargo into the vehicle or unload it from the vehicle. The loading and/or unloading equipment can include, for example, a pivotable gripper arm, a tailgate, or a tail lift. A home automation device can be understood, for example, as a lamp, a louver, a heater, a stove, a refrigerator, a washing machine, a piece of entertainment electronics, or another appliance which is or can be networked in a smart home network. The communication interface can be, for example, a car-to-car, car-to-infrastructure, or smart home interface.

The approach described here is based on the finding that an autonomous or semi-autonomous vehicle can be activated via a suitable communication interface by a smart home, to automatically load or unload the vehicle. The activation of the vehicle can take place depending on the specific embodiment with the aid of car-to-car or car-to-infrastructure communication interfaces already installed in the vehicle or an interface between the vehicle and the smart home.

An essential advantage of the approach provided here is that goods can be delivered or picked up in a timely manner by automated and time-controlled loading or unloading of the vehicle. It is thus possible, for example, to make purchases while out and about. The merchandise delivery can thus take place automatically, whereby time can be saved. Furthermore, time can be saved in that goods, for example, empties, are picked up automatically by the vehicle at a defined location.

According to one specific embodiment, in the step of reading in, a signal provided by an RFID sensor can be read in as the whereabouts signal. Alternatively or additionally, a signal provided by an NFC sensor can be read in as the whereabouts signal. An RFID or NFC sensor can be understood as a sensor for automatic and contactless identification and localization of the vehicle. The whereabouts of the vehicle in the stopping area v be established with high reliability by this specific embodiment.

According to another specific embodiment, the method can include a step of checking an identity of the vehicle by using the whereabouts signal. For this purpose, in the step of providing, the activation signal can be output as a function of a result of the check. A vehicle ID or a type of the vehicle can be checked, for example, in the step of checking. It v be ensured by this specific embodiment that only a specific vehicle or a vehicle of a specific vehicle type is loaded or unloaded in the stopping area in each case.

It is advantageous if, in the step of providing the activation signal, the activation signal is output to furthermore activate a closing device for closing a predetermined loading and/or unloading point in the stopping area. A closing device can be understood, for example, as a gate or door lock or another device for monitoring an access to the loading and/or unloading point. The closing device can be opened with the aid of the activation signal, for example, if the identity of the vehicle has been confirmed in the step of checking. The access to the stopping area can be monitored by this specific embodiment, for example, to prevent merchandise thefts or incorrect deliveries.

According to another specific embodiment, the method can include a step of providing a request signal to request the vehicle via the communication interface. Depending on the specific embodiment, the request signal can include a piece of information about a position of the stopping area, a type, number, or size of a cargo to be loaded or unloaded, a point in time at which the vehicle is to be loaded or unloaded, a type or identity of the vehicle, or a route for reaching the stopping area. Efficient and accurate activation of the vehicle is thus enabled.

It is advantageous for this purpose if, in the step of providing, the request signal is provided to request the vehicle when the vehicle is located at a predetermined distance of, for example, 500 m, 1 km, or 5 km from the stopping area. A travel time of the vehicle to reach the stopping area can thus be shortened.

According to another specific embodiment, in a step of transmitting, a confirmation signal can be transmitted via the communication interface to confirm a loading and/or unloading of the vehicle when the vehicle has been loaded and/or unloaded with the aid of the loading and/or unloading equipment in the stopping area. A correct loading and/or unloading of the vehicle can thus be ensured.

According to an example embodiment, a method for steering an autonomous or semi-autonomous vehicle to a predetermined stopping area to load and/or unload the vehicle includes the steps of: reading in a request signal to request the vehicle via a communication interface to a home automation device and/or an external signal processing unit and/or another vehicle; and providing a control signal using the request signal to steer the vehicle to the stopping area.

An external signal processing unit can be understood, for example, as an infrastructural component for exchanging pieces of information between multiple vehicles.

According to one specific embodiment, in the step of reading in, a piece of information about a position of the stopping area, a type, number, or size of a cargo to be loaded and/or unloaded, a point in time at which the vehicle is to be loaded and/or unloaded, a type or identity of the vehicle, or a route for reaching the stopping area may be read in as the request signal. The efficiency and accuracy of a control of the vehicle can thus be improved.

According to another specific embodiment, in the step of reading in, an activation signal for activating a loading and/or unloading equipment of the vehicle can furthermore be read in. For this purpose, in a step of activating, the loading and/or unloading equipment can be activated using the activation signal to load and/or unload the vehicle in the stopping area. The vehicle can be automatically loaded and/or unloaded by this specific embodiment.

Furthermore, in a step of providing, a whereabouts signal representing a whereabouts of the vehicle in the stopping area can be provided via the communication interface if the vehicle stays in the stopping area. Additionally or alternatively, in a step of transmitting, a confirmation signal can be transmitted via the communication interface to confirm a loading and/or unloading of the vehicle when the vehicle has been loaded and/or unloaded in the stopping area with the aid of the loading and/or unloading equipment. A correct loading and/or unloading of the vehicle can be ensured by this specific embodiment.

These methods can be implemented, for example, in software or hardware or in a hybrid form of software and hardware, for example, in a control unit.

The approach presented here furthermore provides devices which are designed to carry out, activate, and/or implement the steps of a variant of a method presented here in corresponding units. The object on which the present invention is based can also be achieved rapidly and efficiently by this embodiment variant of the present invention in the form of a device.

For this purpose, the device can include at least one processing unit for processing signals or data, at least one memory unit for storing signals or data, at least one interface to a sensor or an actuator for reading in sensor signals from the sensor or for outputting data or control signals to the actuator, and/or at least one communication interface for reading in or outputting data, which are embedded in a communication protocol. The processing unit can be, for example, a signal processor, a microcontroller, or the like, the memory unit being able to be a flash memory, an EPROM, or a magnetic memory unit. The communication interface can be designed, for example, to read in or output data in a wireless and/or wired manner, a communication interface which can read in or output data in a wired manner being able to read in these data, for example, electrically or optically from a corresponding data transmission line or output these data into a corresponding data transmission line.

In one advantageous embodiment, a control of a loading and/or unloading equipment or a control unit of an autonomous or semi-autonomous vehicle is carried out by the device. For this purpose, the device can access, for example, sensor signals such as RFID, NFC, or surroundings sensor signals or signals of other vehicles networked with the vehicle.

A computer program product or computer program having program code which can be stored on a machine-readable carrier or memory medium such as a semiconductor memory, a hard drive memory, or an optical memory and is used to carry out, implement, and/or activate the steps of the method according to one of the above-describe specific embodiments is also advantageous, in particular if the program product or program is executed on a computer or a device.

Exemplary embodiments of the present invention are depicted in the drawings and explained in greater detail in the following description.

DETAILED DESCRIPTION

In the following description of advantageous exemplary embodiments of the present invention, identical or similar reference numerals are used for the elements which are shown in the various figures and act similarly, a repeated description of these elements being omitted.

Figure 1:
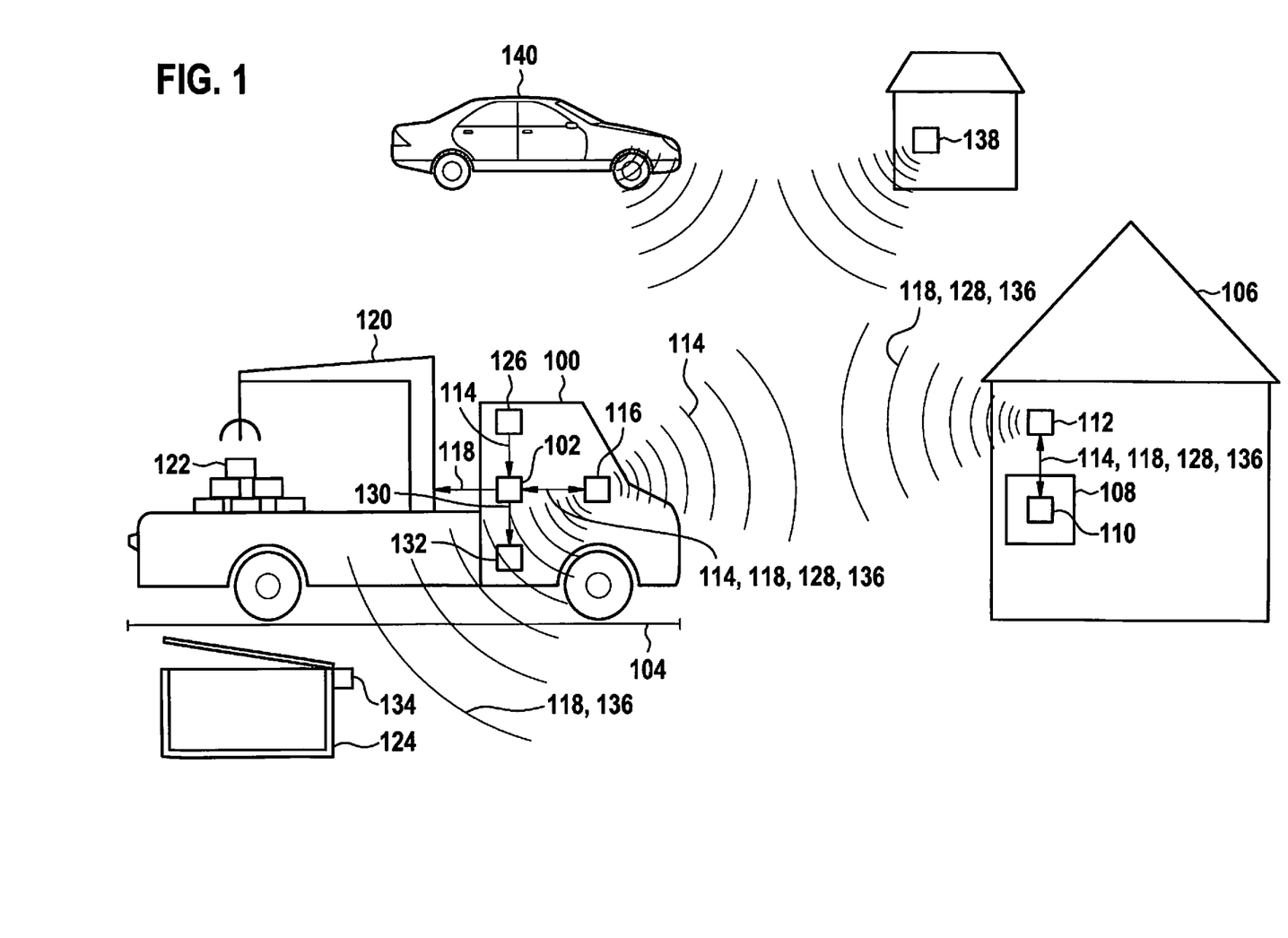
FIG. 1 shows a schematic view of a vehicle including a control device according to an exemplary embodiment of the present invention.

FIG. 1 shows a schematic view of a vehicle 100 including a control device 102 according to one exemplary embodiment. Autonomous or semi-autonomous vehicle 100 is located in a predetermined stopping area 104 for loading and unloading vehicle 100. Stopping area 104 is located in FIG. 1 in front of a house 106, for example, in which a home automation device 108, such as a home appliance, having an activation device 110 is located. Activation device 110 is integrated into home automation device 108 by way of example according to FIG. 1. Alternatively, activation device 110 can also be an external device. Activation device 110 is, for example, part of a smart home system. House 106 furthermore includes a house communication interface 112, which is connected to activation device 110.

According to this exemplary embodiment, control device 102 is designed, upon stopping of vehicle 100 in stopping area 104, to generate a whereabouts signal 114 representing a whereabouts of vehicle 100 in stopping area 104 and transmit it to house communication interface 112 via a vehicle communication interface 116 integrated into vehicle 100. House communication interface 112 is designed to relay whereabouts signal 114 to activation device 110. Activation device 110 is designed to generate an activation signal 118 using whereabouts signal 114 and to transmit it via house communication interface 112 and vehicle communication interface 116 to control device 102, which is designed to activate a loading and/or unloading equipment 120 of vehicle 100, a crane here by way of example, using activation signal 118.

According to the exemplary embodiment shown in FIG. 1, control device 102 activates loading and/or unloading equipment 120 in such a way that a cargo 122 located on vehicle 100 is unloaded at a predetermined loading and/or unloading location 124 in stopping area 104, in a container closable using a door here by way of example.

According to one exemplary embodiment, vehicle 100 is equipped with a vehicle sensor 126, such as an RFID or NFC sensor, which is designed to provide whereabouts signal 114 and transmit it to control device 102 as soon as vehicle 100 stops in stopping area 104. Activation device 110 is designed in this case, for example, to check an identity or type of vehicle 100 on the basis of whereabouts signal 114 provided by vehicle sensor 126 and to only output activation signal 118 if the identity or type of vehicle 100 has been confirmed upon the check.

Alternatively, vehicle sensor 126 transmits whereabouts signal 114 directly to vehicle communication interface 116 or house communication interface 112.

Activation device 110 is designed according to another exemplary embodiment to generate a request signal 128 to request vehicle 100 and output it via house communication interface 112. In this case, control device 102 is designed to read in request signal 128 via vehicle communication interface 116 and to output a control signal 130 to a control unit 132 of vehicle 100 using request signal 128. Control unit 132 is designed to steer vehicle 100 into stopping area 104 using control signal 130. For this purpose, request signal 128 includes, for example, a piece of information about a geographic position of stopping area 104, about a type, number, or size of cargo 122, about a point in time at which the vehicle is to be available in stopping area 104, about a type or identity of vehicle 100, or about a route to reach stopping area 104.

Optionally, activation device 110 is designed to request vehicle 100 with the aid of request signal 128 only if vehicle 100 is located at a predetermined distance from stopping area 104.

According to one optional exemplary embodiment, activation signal 118 is furthermore used to activate a closing device 134 for closing loading and/or unloading point 124, for controlling the door of the container here. For this purpose, for example, vehicle communication interface 116 is designed to transmit activation signal 118 via a radio connection to closing device 134. Accordingly, closing device 134 can be designed to open the door in response to the reception of activation signal 118.

Optionally, activation device 110 is designed to output a confirmation signal 136 via house communication interface 112 as soon as the loading or unloading of vehicle 100 in stopping area 104 is completed. Confirmation signal 136 can be relayed, for example, via vehicle communication interface 116 to closing device 134. Closing device 134 can accordingly be designed to close loading and/or unloading point 124 again in response to the reception of confirmation signal 136.

Depending on the exemplary embodiment, at least one of signals 114, 118, 128, 136 can additionally be transmitted via interfaces 112, 116 to an external signal processing unit 138, for example, a component for managing and controlling a warehouse, or to at least one further vehicle 140 having a corresponding further vehicle communication interface. It is thus possible, for example, to coordinate a plurality of vehicles with one another to automatically carry out loading and/or unloading procedures.

Vehicle 100 is, for example, an autonomous vehicle, which manages without a driver. Vehicle 100 drives autonomously, for example, by independently recognizing a road course, other road users, or obstructions, computing corresponding control commands, and relaying them to actuators in vehicle 100, whereby a driving course of vehicle 100 can be correctly influenced. A driver is not involved in the driving process in a fully autonomous vehicle.

House 106 is implemented, for example, as a so-called smart home, in which all lights, switches, or other home automation devices are networked with one another, store data, or can represent a separate logic. The individual components of the smart home can be at least partially tagged using pieces of information about manufacturer, product name, and performance, i.e., these pieces of information can be stored in the individual components. The smart home includes a separate programming interface, such as house communication interface 112, which is addressable via the Internet and is controllable via expandable apps, for example.

The activation of loading and/or unloading equipment 120 takes place according to one exemplary embodiment using a car-to-car or car-to-infrastructure interface, which is already installed in vehicle 100, as vehicle communication interface 116. Car-to-car communication, referred to in short as car2car or C2C, can be understood as the exchange of pieces of information and data between motor vehicles. The goal of this data exchange is, inter alia, to report critical and hazardous situations early to a driver. Moreover, vehicle-specific data can be exchanged between multiple vehicles via such interfaces. For this purpose, the affected vehicles collect, for example, data about ABS interventions, a steering angle, a position, a direction, or a velocity and transmit them via radio, for example, via WLAN or UMTS, to other road users. A range of vision of the driver can thus be extended using electronic means. Car-to-infrastructure communication, referred to as C2I in short, may be understood as the exchange of data between a vehicle and a surrounding infrastructure, such as a traffic light. The mentioned technologies are based, for example, on an interaction of sensors of various traffic partners. The newest methods of communication technology can be used for this purpose.

Several scenarios are described hereafter, in which both devices 102, 110 for automatic loading and/or unloading of autonomous or semi-autonomous vehicle 100 come into effect.

Merchandise ordered from a department store, for example, can be sent with the aid of vehicle 100 to a household, for example, to house 106 in FIG. 1. In this case, the ordered merchandise is unloaded by vehicle 100 at a defined location, for example, loading and/or unloading point 124, automatically with the aid of automatic unloading equipment 120.

The goods can subsequently be picked up at the defined location. The location can be, for example, an enclosed space in front of house 106, so that the goods can be stored secure from theft. It is also conceivable that the goods are refrigerated inside the space, in particular if they are supermarket purchases. It is thus ensured that the goods are fresh upon pickup.

Conversely, for example, goods such as empties can be placed at a further defined location in the vicinity of house 106 for pickup by vehicle 100. The further location can again be an enclosed space, by which the goods may be protected from theft. Vehicle 100 picks up the goods automatically with the aid of automatic loading equipment 120 in this case. This has the advantage that, for example, empty beverage crates do not have to be cumbersomely returned to a supermarket. Moreover, returns, for example, of goods ordered on the Internet, can be sent back very easily to a shipper in this way. Alternatively, vehicle 100 can also be used for the purpose of trash pickup.

To prevent theft, a unique identification of vehicle 100 at the defined location of loading or unloading is advantageous. Such an identification of vehicle 100 takes place, for example, with the aid of radio frequency identification, abbreviated RFID, or near field communication, abbreviated NFC, as soon as vehicle 100 is located in the vicinity of the defined location for loading or unloading. Subsequently, vehicle 100 only receives access to specific parts of the defined location in front of house 106. Thus, for example, an autonomous postal vehicle can obtain access to a mailbox of house 106 after successful identification, where it automatically deposits or receives new mail or packages. It is also conceivable that an autonomous supermarket vehicle obtains access to a deposit area after successful identification, to deposit purchases with the aid of loading and/or unloading equipment 120. Subsequently, the supermarket vehicle can receive, for example, empties from another area.

To ensure a chronologically smooth sequence of the loading and unloading procedures, according to one exemplary embodiment, use is made of a car-to-car or car-to-infrastructure interface, which is installed in vehicle 100, to the smart home system of house 106. The car-to-car or car-to-infrastructure interface can be implemented as a component of vehicle communication interface 116. Loading and unloading procedures are externally transmitted via the car-to-infrastructure interface to autonomous or semi-autonomous vehicles of a specific type, for example, to a postal, supermarket, or refuse collection vehicle, as assignments. The assignments contain, inter alia, a piece of information about a location of the loading or unloading and a type of the goods to be loaded or unloaded. Feedback about loading or unloading procedures carried out by vehicle 100 also takes place via the car-to-infrastructure interface, for example, to an employer, for example, to the postal service, a supermarket, or a garbage contractor.

The car-to-car interface is used, for example, to coordinate autonomous or semi-autonomous vehicles with one another. This is significant above all in the case of loading procedures, because it is less important in this case by which vehicle the goods are picked up at the defined location. The vehicles communicate via car-to-car communication and automatically coordinate which vehicle picks up which goods at which point in time at which location. It is thus possible to avoid multiple vehicles of the same type loading or unloading goods at the same location. According to one exemplary embodiment, the assignment is always carried out by the vehicle which is located in closest proximity to the assignment location. The vehicles are optionally each equipped with an intelligent trajectory planning unit. Assignments for loading or unloading can thus be executed with the aid of the vehicles in a time-saving and cost-saving manner.

It is possible via house communication interface 112 between vehicle 100 and smart home 106 to order merchandise at a supermarket and have it delivered with the aid of vehicle 100. The unloading procedure of the goods is co-controlled during the delivery by a smart home communication interface, which can be part of vehicle communication interface 116 or house communication interface 112 depending on the exemplary embodiment. The delivery includes, for example, an identification of vehicle 100 with respect to smart home 106 via RFID or NFC. It is furthermore possible via the smart home communication interface to have closing device 134 at loading and/or unloading point 124 be controlled by vehicle 100 or directly by smart home 106. Closing device 134 is thus, for example, only opened for the goods delivery or removal after successful identification of vehicle 100. After completed goods delivery or removal, a purchaser or employer can be informed accordingly with the aid of confirmation signal 136 via the smart home communication interface, for example, by a corresponding message on a smart phone or another mobile terminal. An assignment of the goods delivery or removal by the purchaser or employer via the smart home communication interface is also conceivable. According to another exemplary embodiment, the assignment transmission takes place automatically via the smart home, for example, by activation device 110. In this case, the smart home already knows which goods are delivered by which vehicles having which vehicle ID at which point in time. The smart home can accordingly automatically control an access of the vehicles to the loading or unloading points.

Figure 2:
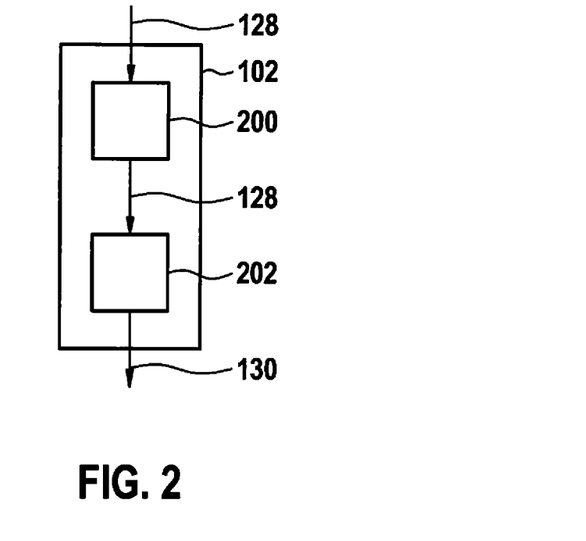
FIG. 2 shows a schematic view of a control device according to an exemplary embodiment of the present invention.

FIG. 2 shows a schematic view of a control device 102 according to one exemplary embodiment, for example, a control device as described above on the basis of FIG. 1. Control device 102 includes a read-in unit 200 for reading in request signal 128 and an output unit 202 for outputting control signal 130 using request signal 128.

Figure 3:
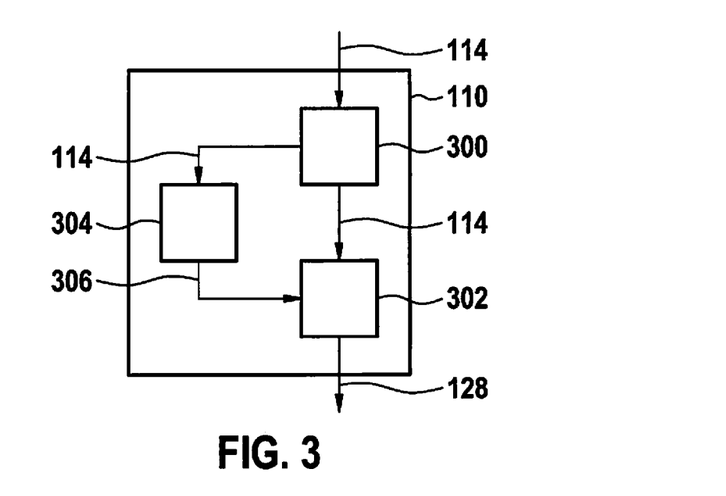
FIG. 3 shows a schematic view of an activation device according to an exemplary embodiment of the present invention.

FIG. 3 shows a schematic view of an activation device 110 according to one exemplary embodiment. Activation device 110 is, for example, an activation device as described above on the basis of FIG. 1. Activation device 110 includes a reading-in unit 300 for reading in whereabouts signal 114 and an output unit 302 for outputting activation signal 118 using whereabouts signal 114.

According to one exemplary embodiment, activation device 110 is implemented having an optional checking unit 304, which is designed to check the identity of the vehicle using whereabouts signal 114 and to transmit an output signal 306 to output unit 302 if the identity of the vehicle has been confirmed upon checking. In this case, output unit 302 is designed to output activation signal 118 in response to the reception of output signal 306.

Figure 4:
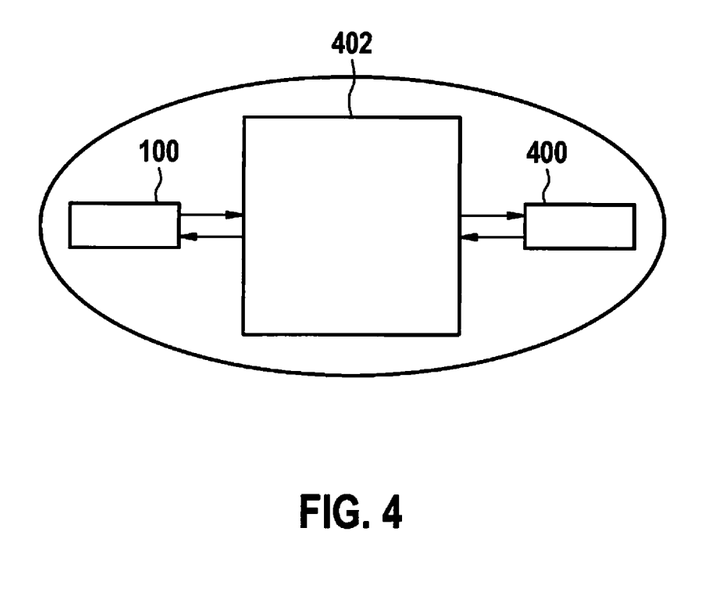
FIG. 4 shows a schematic view of a data exchange between a vehicle and surroundings of the vehicle according to an example embodiment of the present invention.

FIG. 4 shows a schematic view of a data exchange between a vehicle 100 and surroundings 400 of vehicle 100. Surroundings 400 are, for example, another vehicle, an infrastructure, or a smart home. Vehicle 100 and surroundings 400 are connected to one another via at least one interface 402 for data exchange. The data exchange with the aid of interface 402 takes place, for example, via radio connections such as Internet, mobile radio, car-to-car, car-to-infrastructure, broadcast radio, NFC, or a cloud. Interface 402 can include, for example, a vehicle or house communication interface described above on the basis of FIGS. 1 through 3.

A position of a goods exchange, for example, via a satellite-assisted or network-assisted positioning system, a type of the goods to be exchanged, such as size, hazardous material, postal item or purchase, a type of vehicle, for example, a postal vehicle, supermarket vehicle, or refuse collection vehicle, a point in time of the goods exchange, an assignment, and/or planned vehicle trajectories, for example, are exchanged via interface 402 as possible pieces of information.

Figure 5:
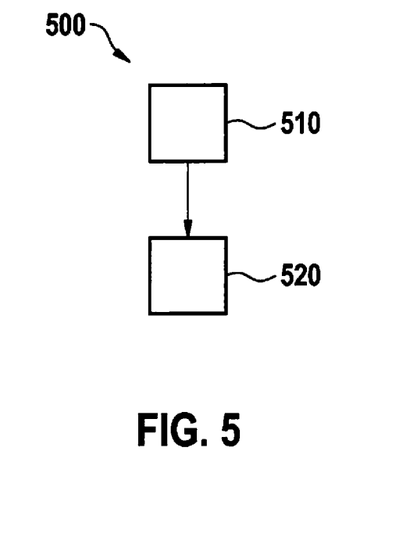
FIG. 5 is a flowchart illustrating a method for activating a loading and/or unloading equipment according to an example embodiment of the present invention.

FIG. 5 is a flowchart of an exemplary embodiment of a method 500 for activating a loading and/or unloading equipment of an autonomous or semi-autonomous vehicle via a home automation device. Method 500 can be carried out or activated, for example, by an activation device described above on the basis of FIGS. 1 through 4. In this case, in a step 510, a whereabouts signal representing a whereabouts of the vehicle in a predetermined stopping area is read in via a communication interface to the vehicle. In a further step 520, an activation signal is output to the communication interface using the whereabouts signal. The loading and/or unloading equipment can be activated with the aid of the activation signal to load and/or unload the vehicle in the stopping area.

Figure 6:
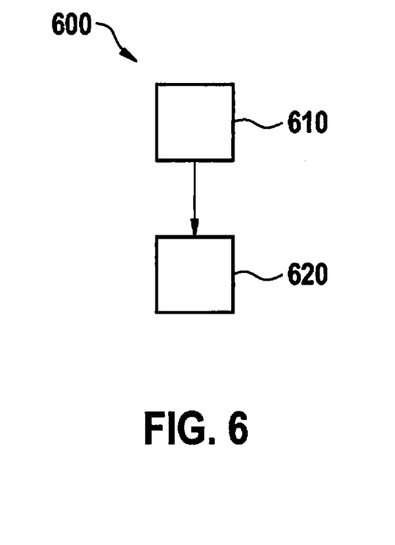
FIG. 6 is a flowchart of a method for controlling a vehicle according to an example embodiment of the present invention.

FIG. 6 is a flowchart of an exemplary embodiment of a method 600 for steering an autonomous or semi-autonomous vehicle to a predetermined stopping area for loading and/or unloading the vehicle. Method 600 can be carried out or activated, for example, by a control device described above on the basis of FIGS. 1 through 4. For this purpose, in a step 610, a request signal to request the vehicle is read in via a communication interface to a home automation device, an external signal processing unit, or another vehicle. In a further step 620, a control signal, which is used to steer the vehicle to the stopping area, is output using the request signal.

If an exemplary embodiment includes an "and/or" linkage between a first feature and a second feature, this is to be read in such a way that the exemplary embodiment includes both the first feature and the second feature according to one specific embodiment and includes either only the first feature or only the second feature according to other specific embodiments.

What is claimed is:

1. A method for activating equipment of an autonomous or semi-autonomous vehicle via a home automation device, the method comprising:
    reading in, via a communication interface and from the vehicle, a whereabouts signal representing a whereabouts of the vehicle in a predetermined stopping area; and
    based on the whereabouts signal, providing, to the vehicle and via the communication interface, an activation signal to activate the equipment to at least one of load the vehicle in the stopping area and unload the vehicle in the stopping area.

2. The method of claim 1, wherein, in the step of reading in, the whereabouts signal is provided by at least one of an RFID and an NFC sensor.

3. The method of claim 1, further comprising determining an identity of the vehicle using the whereabouts signal, wherein the providing of the activation signal is based on the determined identity.

4. The method as recited in claim 3, wherein the activation signal is provided only when the determined identity is confirmed.

5. The method of claim 1, wherein the activation signal activates a closing device to close at least one of a predetermined loading point and unloading point in the stopping area.

6. The method of claim 1, further comprising providing, via the communication interface, a request signal that makes a request to the vehicle and that includes a piece of information about at least one of a position of the stopping area, a type of a cargo to be at least one of loaded and unloaded, a number of the cargo to be at least one of loaded and unloaded, a size of the cargo to be at least one of loaded and unloaded, a point in time at which the vehicle is to be at least one of loaded and unloaded, at least one of a type and identity of the vehicle, and a route for reaching the stopping area.

7. The method of claim 6, wherein, in the step of providing the request signal, the request signal is provided to request the vehicle conditional upon the vehicle being within a predetermined distance from the stopping area.

8. The method of claim 1, further comprising transmitting via the communication interface a confirmation signal that confirms at least one of a loading and an unloading of the vehicle in response to completion of the at least one of the loading and loading of the vehicle in the stopping area using the equipment.

9. The method as recited in claim 1, wherein in response to the activation signal, the equipment: (i) loading the vehicle from a predetermined loading point, and/or (ii) unloading the vehicle to a predetermined loading point, and wherein the activation signal activates a closing device to open the predetermined loading point prior to the equipment loading the vehicle from the predetermined loading point, and/or unloading the vehicle to the predetermined loading point.

10. The method as recited in claim 9, wherein the predetermined loading point is a container and the closing device is a door of the container.

11. The method as recited in claim 9, wherein the closing device is a gate.

12. The method as recited in claim 1, wherein in response to the activation signal, the equipment: (i) loading the vehicle from a predetermined loading point, and/or (ii) unloading the vehicle to a predetermined loading point, and wherein the activation signal activates a closing device to close the predetermined loading point after the equipment loads the vehicle from the predetermined loading point, and/or unloads the vehicle to the predetermined loading point.

13. A method for steering an autonomous or semi-autonomous first vehicle to a predetermined stopping area for at least one of loading the first vehicle and unloading the first vehicle, the method comprising:
    reading in, via a communication interface to at least one of a home automation device, an external signal processing unit, and a second vehicle, a request signal requesting the first vehicle;
    based on the request signal, providing a control signal to steer the first vehicle to the stopping area;
    reading in an activation signal and, responsive to the activation signal, activating equipment of the first vehicle to perform, in the stopping area, the at least one of the loading of the first vehicle and the unloading of the first vehicle, the activated equipment loading the first vehicle from a container in the stopping area and/or unloading the first vehicle into the container in the stopping area; and
    wherein the activation signal activates a door of the container to open the container for the at least one of the loading of the first vehicle and the unloading of the first vehicle.

14. The method of claim 13, wherein the request signal includes a piece of information about at least one of a position of the stopping area, a type of a cargo to be at least one of loaded and unloaded, a number of the cargo to be at least one of loaded and unloaded, a size of the cargo to be at least one of loaded and unloaded, a point in time at which the first vehicle is to be at least one of loaded and unloaded, at least one of a type and identity of the first vehicle, and a route for reaching the stopping area.

15. The method of claim 13, further comprising providing, via the communication interface, a whereabouts signal that represents a whereabouts of the first vehicle in the stopping area when the first vehicle is located in the stopping area.

16. The method of claim 13, further comprising transmitting, via the communication interface, a confirmation signal to confirm completion of the at least one of the loading and unloading of the first vehicle in response to the completion of the at least one of the loading and the unloading in the stopping area using the equipment.

17. The method of claim 16, further comprising activating, using the confirmation signal, the door of the container to close the container.

18. An activation device comprising:
   an input;
   an output; and
   a processor, wherein the processor is configured to perform a method for activating equipment of an autonomous or semi-autonomous vehicle, the method comprising:
      reading in, using the input, via a communication interface, and from the vehicle, a whereabouts signal representing a whereabouts of the vehicle in a predetermined stopping area; and
      based on the whereabouts signal, providing, using the output, via the communication interface, and to the vehicle, an activation signal to activate the equipment to at least one of load the vehicle in the stopping area and unload the vehicle in the stopping area.

19. A control device of an autonomous or semi-autonomous first vehicle, the control device comprising:
   an input;
   an output; and
   a processor, wherein the processor is configured to perform a method for steering the first vehicle to a predetermined stopping area for at least one of loading the first vehicle and unloading the first vehicle, the method comprising:
      reading in, using the input and via a communication interface to at least one of a home automation device, an external signal processing unit, and a second vehicle, a request signal requesting the first vehicle;
      based on the request signal, providing, using the output, a control signal to steer the first vehicle to the stopping area;
      reading in an activation signal and, responsive to the activation signal, activating equipment of the first vehicle to perform, in the stopping area, the at least one of the loading of the first vehicle and the unloading of the first vehicle, the activated equipment loading the first vehicle from a container in the stopping area and/or unloading the first vehicle into the container in the stopping area; and
      wherein the activation signal activates a door of the container to open the container for the at least one of the loading of the first vehicle and the unloading of the first vehicle.

20. A non-transitory computer-readable medium on which are stored instructions that are executable by a processor and that, when executed by the processor, cause the processor to perform a method for activating equipment of an autonomous or semi-autonomous vehicle via a home automation device, the method comprising:
   reading in, via a communication interface and from the vehicle, a whereabouts signal representing a whereabouts of the vehicle in a predetermined stopping area; and
   based on the whereabouts signal, providing, to the vehicle and via the communication interface, an activation signal to activate the equipment to at least one of load the vehicle in the stopping area and unload the vehicle in the stopping area.

21. A non-transitory computer-readable medium on which are stored instructions that are executable by a processor of an autonomous or semi-autonomous first vehicle and that, when executed by the processor, cause the processor to perform a method for steering the first vehicle to a predetermined stopping area for at least one of loading the first vehicle and unloading the first vehicle, the method comprising:
   reading in, via a communication interface to at least one of a home automation device, an external signal processing unit, and a second vehicle, a request signal requesting the first vehicle; and
   based on the request signal, providing a control signal to steer the first vehicle to the stopping area;
   reading in an activation signal and, responsive to the activation signal, activating equipment of the first vehicle to perform, in the stopping area, the at least one of the loading of the first vehicle and the unloading of the first vehicle, the activated equipment loading the first vehicle from a container in the stopping area and/or unloading the first vehicle into the container in the stopping area; and
   wherein the activation signal activates a door of the container to open the container for the at least one of the loading of the first vehicle and the unloading of the first vehicle.

* * * * *